United States Patent
Kim et al.

(10) Patent No.: US 6,404,470 B1
(45) Date of Patent: Jun. 11, 2002

(54) LIQUID CRYSTAL DISPLAY HAVING HIGH APERTURE RATIO AND HIGH TRANSMITTANCE

(75) Inventors: Hyang Yul Kim; Seung Hee Lee, both of Kyoungki-do; Seok Lyul Lee, Seoul, all of (KR)

(73) Assignee: Hyundai Display Technology Inc., Kyoungki-do (KR)

( * ) Notice: Subject to any disclaimer, the term of this patent is extended or adjusted under 35 U.S.C. 154(b) by 0 days.

(21) Appl. No.: 09/474,709

(22) Filed: Dec. 29, 1999

(30) Foreign Application Priority Data

Dec. 30, 1998 (KR) .............................. 98-61876

(51) Int. Cl.$^7$ ............................................ G02F 1/1343
(52) U.S. Cl. ...................................... 349/110; 349/141
(58) Field of Search ............................ 349/43, 141, 110

(56) References Cited

U.S. PATENT DOCUMENTS

| | | | | |
|---|---|---|---|---|
| 5,914,762 A | * | 6/1999 | Lee et al. .................... | 349/141 |
| 5,959,708 A | | 9/1999 | Lee et al. .................... | 349/143 |
| 6,281,953 B1 | * | 8/2001 | Lee et al. ..................... | 349/43 |

FOREIGN PATENT DOCUMENTS

| | | | | |
|---|---|---|---|---|
| JP | 08179259 | 7/1996 | .............. | G02F/1/13 |
| JP | 09328618 | 12/1997 | ......... | C08L/101/00 |
| JP | 10123565 | 5/1998 | ........... | G02F/1/136 |

\* cited by examiner

*Primary Examiner*—Kenneth Parker
*Assistant Examiner*—V Litovchenko
(74) *Attorney, Agent, or Firm*—Ladas & Parry

(57) ABSTRACT

Disclosed is a liquid crystal display having high aperture ratio and high transmittance comprising: first and second transparent insulating substrates opposed with intervening a liquid crystal layer; gate bus lines and data bus lines arranged cross to each other on the first transparent insulating substrate so as to define pixel regions; a counter electrode disposed within each pixel region, made of a transparent conductive material, and having a plurality of first branches disposed parallel with the data bus lines with equal distance and a bar connecting one ends of the first branches; a common signal line applying a common signal to the counter electrode disposed within each pixel region, contacted with the bar of the counter electrode, disposed parallel with the gate bus line, and having a pair of second branches branched toward the data bus line and disposed between the data bus line and the first branches of both edges of the counter electrode; a pixel electrode disposed within each pixel region to generate a fringe field together with the counter electrode, made of a transparent conductive material, and having a plurality of third branches disposed parallel to the data bus line with equal distance, a first bar connecting one ends of the third branches, a second bar connecting the other ends of the third branches; and a black matrix disposed at a portion of the second transparent insulating substrate corresponding to the gate bus line, the data bus line and the common signal line, wherein width of the black matrix at the portion corresponding to the common signal line is narrower than that of the common signal line.

2 Claims, 3 Drawing Sheets

LIQUID CRYSTAL DISPLAY HAVING HIGH APERTURE RATIO AND HIGH TRANSMITTANCE

BACKGROUND OF THE INVENTION

1. Field of the Invention

This invention generally relates to a liquid crystal display having high aperture ratio and high transmittance, more particularly to a liquid crystal display having high aperture ratio and high transmittance capable of preventing the aperture ratio from deterioration that is originated from a black matrix.

2. Description of the Related Art

An active matrix liquid crystal display has an advantage of excellent response characteristic and is appropriate for high number of pixels. Therefore, high quality and large size of display devices comparable to the cathode ray tube ("CRT"), is realized.

The active matrix liquid crystal display has employed as its operation mode mainly a twist nematic(TN) mode and a super twist nematic(STN) mode, both to which an electric field disposed vertical to substrates is applied. The TN mode and STN mode liquid crystal displays have been commercially used, however they have narrow viewing angle characteristics. According to this disadvantage, an in-plane switching("IPS") mode liquid crystal display has been proposed to improve the narrow viewing angle characteristics of TN mode and STN mode liquid crystal displays.

Although not shown, in the IPS mode liquid crystal display, a pixel electrode and a counter electrode to drive liquid crystal molecules are formed on the same substrate in parallel to each other, also there is formed an electric field which is in-plane to the substrate surface. The IPS mode liquid crystal display has an advantage of wider viewing angle than that of the TN mode or the STN mode liquid crystal displays, however, improving the transmittance is limited since the pixel and the counter electrodes are made of opaque metal layers.

Accordingly, in order to overcome those limitations of high aperture ratio and high transmittance in the IPS mode liquid crystal display, a fringe field switching("FFS") mode liquid crystal display has been proposed. The FFS mode liquid crystal display is named as "liquid crystal display having high aperture ratio and high transmittance".

In the FFS mode liquid crystal display, a pixel electrode and a counter electrode are made of transparent metal layers, and then the aperture ratio thereof is more improved compared to that of the IPS mode liquid crystal display. Further, since a distance between the pixel electrode and the counter electrode is narrower than that of the upper and lower substrates, a fringe field is formed at upper portions of the counter and the pixel electrodes when the FFS mode liquid crystal display is driven. Then, the transmittance thereof is more improved compared to that of the IPS mode liquid crystal display since liquid crystal molecules arranged over those electrodes are all driven.

FIG. 1 is a cross-sectional view showing an outline of the conventional FFS mode liquid crystal display. As shown in the drawing, a first transparent insulating substrate 1 and a second transparent insulating substrate 11 are opposed with a selected distance, and a liquid crystal layer 18 is interposed between the first transparent insulating substrate 1 and the second transparent insulating substrate 11. Herein, the distance between the first transparent insulating substrate 1 and the second transparent insulating substrate 11 is referred to as a cell gap d.

A counter electrode 3 is formed on the first transparent insulating substrate 1. The counter electrode 3 is made of a transparent metal layer such as ITO, and the counter electrode 3 to be described afterward in detail has a comb shape including a plurality of first branches 3a. A gate insulating layer 5 is formed on the first transparent insulating substrate 1 so as to cover the counter electrode 3. A pixel electrode 7 is formed on the gate insulating layer 5. The pixel electrode 7 is made of a transparent metal layer such as ITO. Similar to the counter electrode 3, the pixel electrode 7 to be described afterward in detail has a comb shape including a plurality of second branches 7a. The second branches 7a are disposed between the first branches 3a of the counter electrode 3. The reference symbol l means a distance between the branch 3a of the counter electrode 3 and the branch 7a of the pixel electrode 7, and herein the reference symbol l is smaller than the cell gap d i.e. the distance between the first transparent insulating substrate 1 and the second transparent insulating substrate 11.

Color filers 14 of red, green and blue are formed on the second transparent insulating substrate 11, and a black matrix for color separation is formed between the color filters 14. The black matrix 12 is made of an opaque material so as to prevent light leakage.

A first alignment layer 9 and a second alignment layer 16 are formed at the uppermost portions of the first and the second transparent insulating substrates 1,11 respectively so that those alignment layers 9,16 function to align the liquid crystal molecules previous to forming electric field. Those alignment layers 9,16 have low pretilt angle of approximately below 2°, and they are rubbed under anti-parallel state so as to make a selected angle of degrees with respect to the direction of the electric field.

FIG. 2 is a plane view showing a conventional FFS mode liquid crystal display. As shown in the drawing, a gate bus line 2 and a data bus line 4 are disposed cross to each other to define a pixel region. A thin film transistor 10, hereinafter TFT is disposed at a portion of intersection of the gate bus line 2 and the data bus line 4. A counter electrode 3 is disposed within the pixel region defined by the gate bus line 2 and the data bus line 4. The counter electrode 3 includes a plurality of first branches 3a and a bar 3b connecting one ends of the first branches 3a. A common signal line 100 is made of an opaque material of high conductivity so as to transmit a common signal to the counter electrode disposed at each pixel region without signal delay. The common signal line 100 includes a second branch 100a disposed between the data bus line 4 and the first branch 3a at both edges of the counter electrode 3, and the common signal line 100 is contacted with the bar 3b of the counter electrode 3. The second branch 100a serves to block the light leakage at a space between the first branch 3a at both edges of the counter electrode 3 and the data bus line 4.

A pixel electrode 7 is disposed over the counter electrode 3. The pixel electrode 7 includes a plurality of third branches 7a, a first bar 7b connecting one ends of the third branches 7a and a second bar 7c connecting the other ends of the third branches 7a. The third branches 7a are disposed between the first branches 3a of the counter electrode 3. A black matrix 12 is disposed to prevent light leakage. Reference symbol BM1 means an inner boundary of the black matrix 12 and BM2 means an outer boundary of the black matrix 12.

In the FFS mode liquid crystal display having the foregoing constructions, according to influence of the alignment layers, the liquid crystal molecules are arranged almost parallel with the substrate surface before an electric field is formed between the counter and the pixel electrodes. On the other hand, when the electric field is formed between the counter and the pixel electrodes, the electric field is formed as a fringe field having a vertical component. Then, the liquid crystal molecules are twisted such that the optical axes thereof are aligned in a direction parallel to or perpendicular to the direction of the electric field, thereby leaking light.

The FFS mode liquid crystal display obtains high aperture ratio since the counter and the pixel electrodes are made of a transparent conductive material, and the FFS mode liquid crystal display obtains high transmittance since the liquid crystal molecules over the liquid crystal display are all driven owing to the narrow distance between those electrodes.

Meanwhile, as shown in FIG. 2, there may be formed a fringe field at a portion where ends of the bar 3b of the counter electrode 3 and the third branch 7a of the pixel electrode 7 meet each other. Therefore, the liquid crystal molecules at the above-mentioned portion have a different arrangement during the operation of the liquid crystal display, thereby occurring deterioration of display quality. Consequently, the portion having different arrangement of liquid crystal molecules is blocked by the black matrix 12 in the conventional art.

Namely, the black matrix 12 is designed to correspond with the boundary of pixel region i.e. the gate bus line 2 and the data bus line 4, and also the black matrix 12 is designed to extend to inside of the pixel region such that the black matrix is further extended from an aperture region from the bar 3b of the counter electrode 3 by a selected width ×2, for example 2~4 µm. Also, the common signal line 100 is designed with a width ×1 approximately 34 µm within a unit pixel region of 100×330 µm so that with decreasing signal delay, a sufficient auxiliary capacitance is formed at the bar 3b of the counter electrode 3. Therefore, the black matrix 12 is designed with a width at least 38 µm from an upper boundary of the pixel region so that the common signal line 100 is blocked.

However, this design of the black matrix 12 is discrepant from the original spirit of FFS mode liquid crystal display for obtaining high transmittance, since the aperture region in the pixel region is decreased.

SUMMARY OF THE INVENTION

Accordingly, the object of the present invention is to provide a liquid crystal display having high aperture ratio and high transmittance capable of preventing deterioration of aperture ratio.

To accomplish the foregoing object, liquid crystal display having high aperture ratio and high transmittance of the present invention comprises: first and second transparent insulating substrates opposed with intervening a liquid crystal layer; gate bus lines and data bus lines arranged cross to each other on the first transparent insulating substrate so as to define pixel regions; a counter electrode disposed within each pixel region, made of a transparent conductive material, and having a plurality of first branches disposed parallel with the data bus lines with equal distance and a bar connecting one ends of the first branches; a common signal line applying a common signal to the counter electrode disposed within each pixel region, contacted with the bar of the counter electrode, disposed parallel with the gate bus line, and having a pair of second branches branched toward the data bus line and disposed between the data bus line and the first branches of both edges of the counter electrode; a pixel electrode disposed within each pixel region to generate a fringe field together with the counter electrode, made of a transparent conductive material, and having a plurality of third branches disposed parallel to the data bus line with equal distance, a first bar connecting one ends of the third branches, a second bar connecting the other ends of the third branches; and a black matrix disposed at a portion of the second transparent insulating substrate corresponding to the gate bus line, the data bus line and the common signal line, wherein width of the black matrix at the portion corresponding to the common signal line is narrower than that of the common signal line.

BRIEF DESCRIPTION OF THE DRAWINGS

The above object and features of the invention will more fully be apparent from the following detailed description with accompanying description with accompanying drawings.

DETAILED DESCRIPTION OF THE INVENTION

Figure 1:
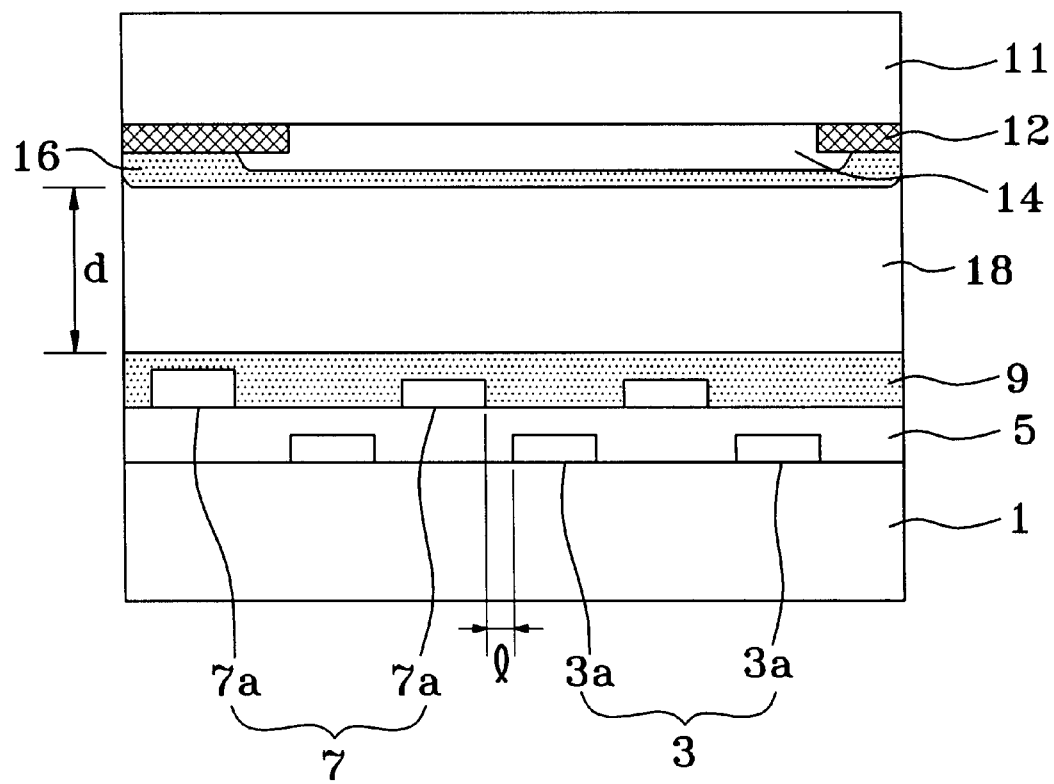
FIG. 1 is a cross-sectional view showing a conventional liquid crystal display having high aperture ratio and high transmittance.
Figure 2:
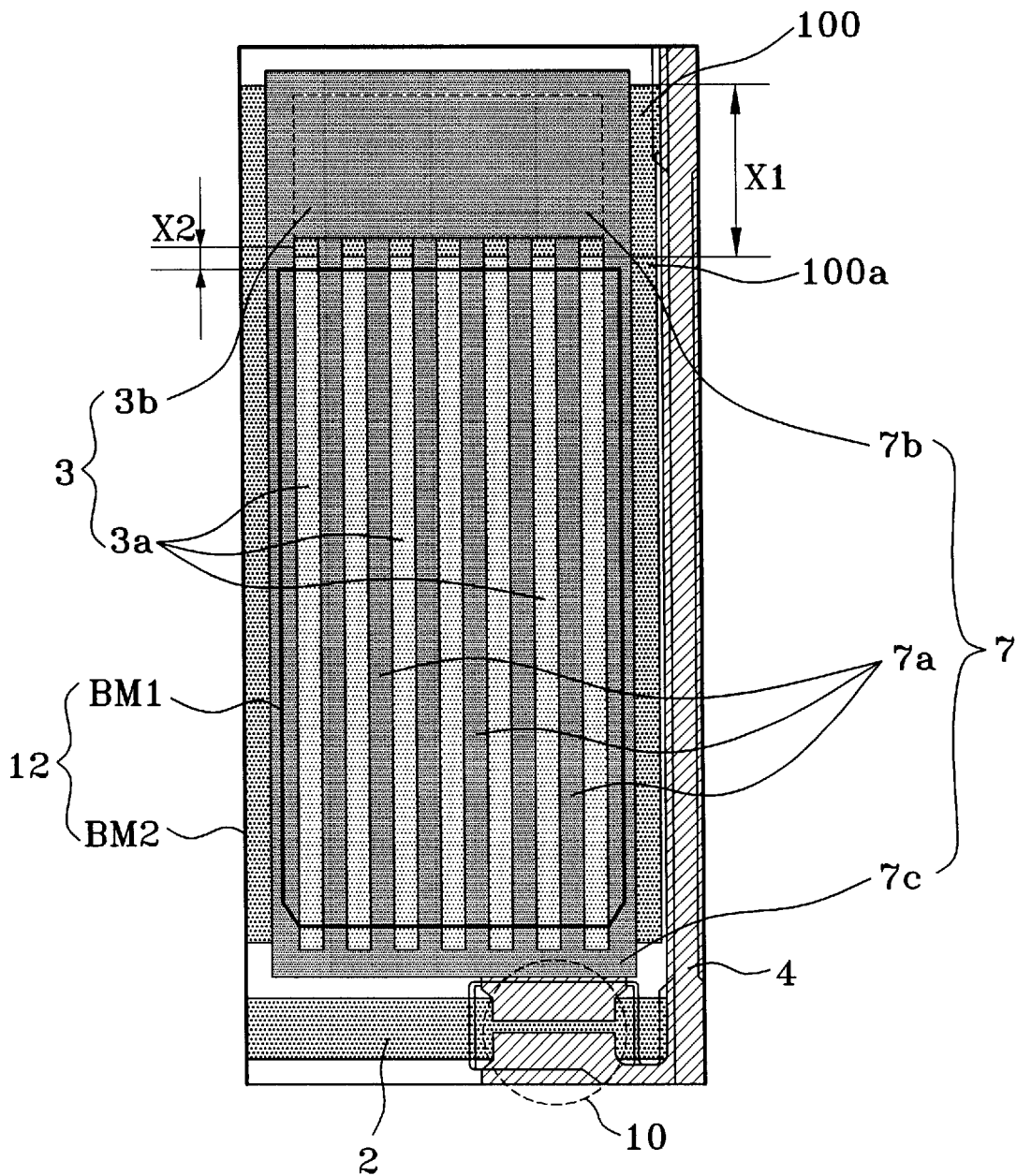
FIG. 2 is a plane view showing the conventional liquid crystal display having high aperture ratio and high transmittance.
Figure 3:
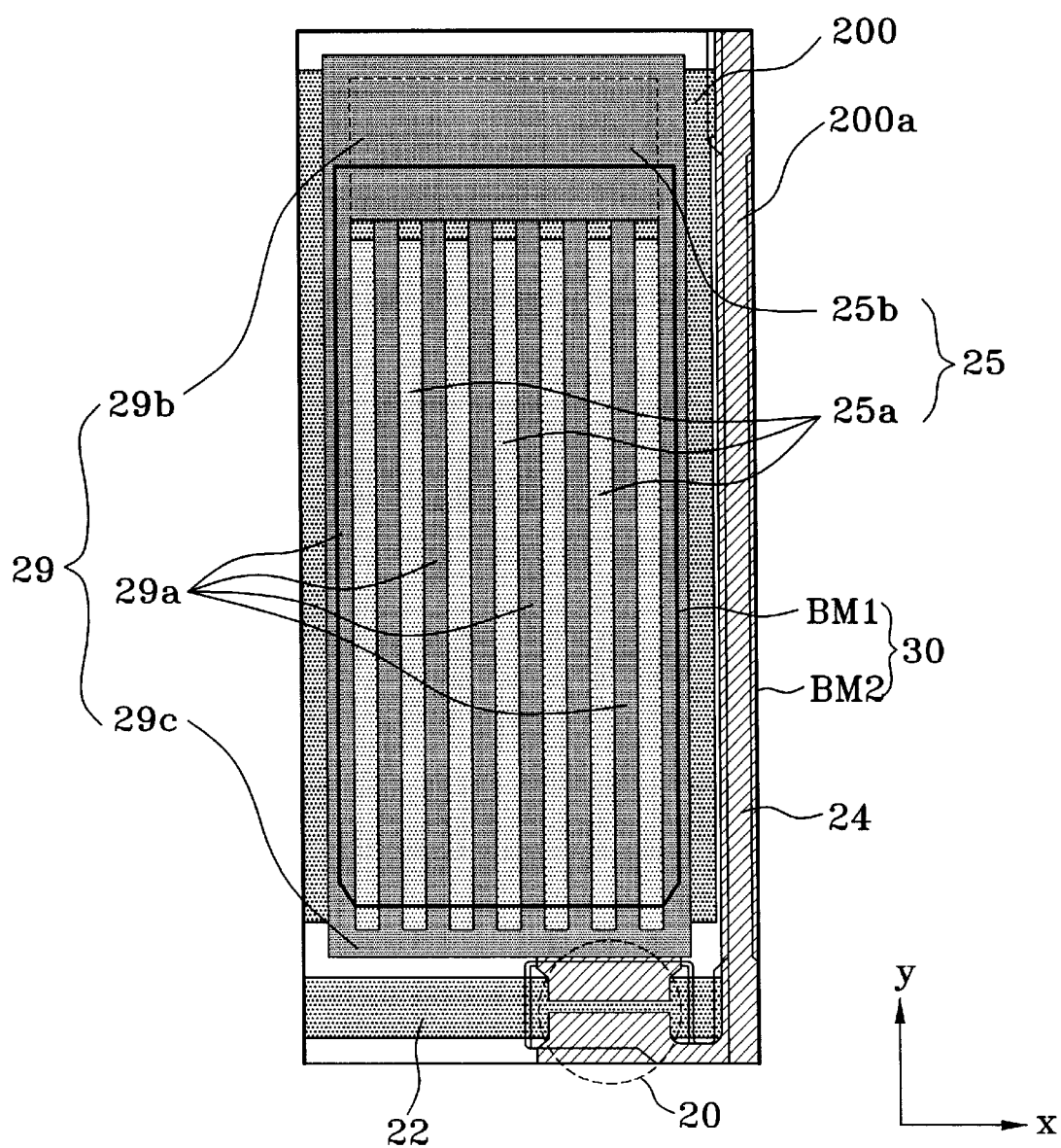
FIG. 3 is a plane view showing a liquid crystal display having high aperture ratio and high transmittance according to the present invention.

Referring to FIG. 3, on a first transparent insulating substrate(not shown), a gate bus line 22 is arranged in the x direction and a data bus line 24 is arranged in the y direction perpendicular to the gate bus line 22. A pixel region is defined by the gate bus line 22 and the data bus line 24. A thin film transistor 20 is disposed at a portion of intersection of the gate bus line 22 and the data bus line 24.

A counter electrode 25 is disposed within the pixel region. The counter electrode 25 is made of a transparent conductive material. The counter electrode 25 includes a plurality of first branches 25a having a selected width and disposed parallel with the data bus line 24 with equal distance, and a bar 25b for connecting one ends of the first branches 25a.

A common signal line 200 is disposed parallel with the gate bus lines 22 so that a common signal is transmitted to the counter electrode 25 disposed within each pixel region. The common signal line 200 is formed simultaneously with the gate bus line 22. The common signal line 200 is made of an opaque metal layer having high conductivity and is contacted with the bar 25b of the counter electrode 25. The common signal line also includes a pair of second branches 200a that is branched toward the data bus line 24 and is disposed between the data bus line 24 and the first branches 25a of both edges of the counter electrode 25. The common signal line 200 is designed with a width of 33~35 µm, preferably 34 µm when a size of unit pixel region is 110×330 µm. Furthermore, the second branch 200a is formed with a selected width capable of blocking a space between the data bus line 24 and the first branch 25a of the edge of the counter electrode 25 entirely.

A pixel electrode 29 is disposed within the pixel region similar to the method of forming the counter electrode 25. The pixel electrode 29 is made of a transparent conductive material. The pixel electrode 29 includes a plurality of third branches 29a disposed parallel to the data bus line 24 with equal distance, a first bar 29b connecting one ends of the third branches 29a and overlapped with the bar 25a of the counter electrode 25, and a second bar 29c connecting the other ends of the third branches 29a and connected to the thin film transistor 20. Herein, the third branches 29a of the pixel electrode 29 are disposed between the first branches 25a of the counter electrode 25a respectively. The first bar 29b of the pixel electrode 29 generates a storage capacitance with the bar 2b of the counter electrode 25.

In order to prevent light leakage, a black matrix 30 formed at a second transparent insulating substrate (not shown) is opposed with intervening a liquid crystal layer (not shown) to the first transparent insulating substrate in which the pixel electrode 29 is formed. In this embodiment, the black matrix 30 is not disposed toward inside of an aperture region at a portion thereof corresponding to the common signal line 200. Nevertheless, a leakage light at a portion where the bar 25b of the counter electrode 25 meets the ends of the third branches 29a of the pixel electrode 29, is blocked since the common signal line 200 functions as a black matrix.

In detail, the black matrix 30 is disposed at the portion corresponding to not only the gate bus line 22 and the data bus line 24, but also the common signal line 200 and the second branches 200a of the common signal line 200. In FIG. 3, BM1 means an inner boundary of the black matrix 30 and BM2 means an outer boundary of the black matrix 30. Since a connecting part of the bar 25b of the counter electrode 25 contacted with the common signal line 200 and the first branches 25a of the counter electrode 25, is blocked by the common signal line 200, an abnormal arrangement of liquid crystal molecules due to a parasitic fringe field generated between the bar 25b of the counter electrode 25 and the third branches 29a of the pixel electrode 29 can be blocked by the common signal line 200.

Accordingly, since the common signal line 200 made of the opaque conductive material functions as a black matrix, the inner boundary BM1 of the black matrix 30 at the portion corresponding to the common signal line 200 is not extended to the aperture region, but the inner boundary BM1 can be disposed on the common signal line 200. For example, a width of the black matrix 30 at the portion corresponding to the common signal line 200 is selected 16~18 $\mu$m, more preferably 17 $\mu$m that is more narrower than the conventional width such as 38 $\mu$m. As a result, the size of aperture region is increased compared to that of the conventional liquid crystal display, since the black matrix 30 is disposed without blocking the aperture region, thereby obtaining high aperture ratio.

According to this invention, since the common signal line part disposed at the connecting part of branches of the counter electrode or the pixel electrode functions as a black matrix, an abnormal arrangement of liquid crystal molecules due to the parasitic fringe field generating at the connecting part of the branches can be blocked by the common signal line. Therefore, there is no need the black matrix to be extended toward the aperture region for blocking the aforementioned portion, thereby obtaining the enhanced aperture ratio.

While the present invention has been described with reference to certain preferred embodiments, various other modifications will be apparent to and can be readily made by those skilled in the art without departing from the scope and spirit of the present invention.

What is claimed is:

1. A liquid crystal display having high aperture ratio and high transmittance comprising:

first and second transparent insulating substrates opposed with intervening a liquid crystal layer;

gate bus lines and data bus lines arranged cross to each other on the first transparent insulating substrate so as to define pixel regions;

a counter electrode disposed within each pixel region, made of a transparent conductive material, and having a plurality of first branches disposed parallel with the data bus lines with equal distance and a bar connecting one ends of the first branches;

a common signal line applying a common signal to the counter electrode disposed within each pixel region, contacted with the bar of the counter electrode, disposed parallel with the gate bus line, and having a pair of second branches branched toward the data bus line and disposed between the data bus line and the first branches of both edges of the counter electrode;

a pixel electrode disposed within each pixel region to generate a fringe field together with the counter electrode, made of a transparent conductive material, and having a plurality of third branches disposed parallel to the data bus line with equal distance, a first bar connecting one ends of the third branches, a second bar connecting the other ends of the third branches; and a black matrix disposed at a portion of the second transparent insulating substrate corresponding to the gate bus line, the data bus line and the common signal line, wherein width of the black matrix at the portion corresponding to the common signal line is narrower than that of the common signal line.

2. The liquid crystal display having high aperture ratio and high transmittance of claim 1, wherein width of the common signal line is 33~35 $\mu$m, and width of the black matrix portion corresponding to the common signal line is 16~18 $\mu$m when a unit pixel region is 110×330 $\mu$m.

* * * * *